Patented June 6, 1933

1,912,812

UNITED STATES PATENT OFFICE

THEODOR WEIGEL, OF COLOGNE-MULHEIM, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

ACCELERATING VULCANIZATION

No Drawing. Application filed March 13, 1930, Serial No. 435,664, and in Germany March 18, 1929.

The present invention relates to a process for accelerating vulcanization and consists in incorporating into natural or artificial rubber varieties a condensation product obtained from ammonia and an unsaturated aldehyde in quantities of about 0.3-5% calculated on the rubber.

It is already known that difficulty volatile derivatives of readily volatile bases are accelerators in vulcanization. It is likewise known that bases the dissociation constant of which is greater than $1 \times 10^{-8}$ accelerate the vulcanization. These known compounds are, for instance, the condensation products of saturated aldehydes and ammonia, for example, acetaldehyde ammonia, butyric aldehyde ammonia and hexamethylenetetramine, which are used in practice as accelerators.

In accordance with the present invention condensation products obtainable from ammonia and crotonic aldehyde or other unsaturated aldehydes, such as acrolein, methyl propyl acrolein, ethyl propyl acrolein and the like are employed as accelerators in vulcanization. These condensation products are distinguished by particular advantages inasmuch as they exert a considerably stronger action than the hitherto used condensation products from saturated aldehydes and ammonia and nevertheless have the advantage of possessing a very favorable critical temperature, that is to say, vulcanization mixtures produced from the new accelerators do not tend to vulcanize at a low temperature and can accordingly be worked up, for example, on the tubing machine without further treatment. This effect constitutes an important advance particularly in the cable industry. The new accelerators are absolutely stable compounds, the rubbers produced therewith possessing excellent ageing properties.

A crotonic aldehyde ammonia condensation product was obtained by Wurtz (see C. r. 88, 1154) by adding crotonic aldehyde to aqueous ammonia while strongly cooling, and subsequently heating the mixture to 100° C. According to the investigations of Delepine (see C. r. 144, 855) the constitution thereof appears to be that of a tricrotonylidenetetramine of the following formula:

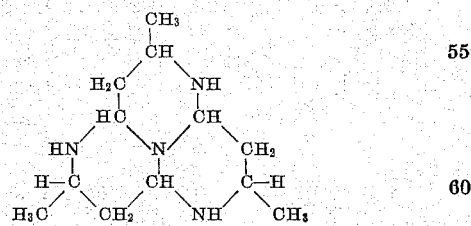

The substance, when it contains water of crystallization, melts at 97° C. and without water of crystallization at 102° C.; the boiling point under 4 mm pressure is 146-147° C. In addition to this compound another condensation product can also be isolated from the reaction mixture of crotonic aldehyde and ammonia, which is an isomer of the former. This compound, when it contains water of crystallization, melts at 77° C.; without water of crystallization it is a highly viscous oil, which boils at 138-140° C. under 3 mm pressure.

Both hydrated and anhydrous substances can be used as accelerators. Particularly good effects are obtained by adding a mixture of the two isomers to the mixture to be vulcanized.

The invention is illustrated by the following examples, without being restricted thereto, the parts being by weight.

*Example 1*

For the vulcanization a mixture is used, containing for every 100 parts of smoked sheets 6 parts of sulfur, 5 parts of zinc oxide and 1 part of crotonylidenetetramine (melting point=97° C.). The following table shows the superiority of this accelerator as compared with those obtainable from the saturated aldehydes and ammonia:—

Acetaldehyde ammonia = A
Hexamethylenetetramine = H
Butyricaldehyde ammonia = B
Tricrotonylidenetetramine = T
(M. P. = 97° C.)

| Vulc. | | A | | H | | B | | T | |
|---|---|---|---|---|---|---|---|---|---|
| Min. | Atm. | Strength kg/sq. cm. | Extension per cent | Strength kg/sq. cm. | Extension | Strength kg/sq. cm. | Extension per cent | Strength kg/sq. cm. | Extension per cent |
| 15 | 3½ | 114 | 807 | 67 | 944 | 114 | 792 | 180 | 725 |
| 30 | 3½ | 134 | 783 | 123 | 836 | 148 | 781 | 148 | 1 620 |
| 45 | 3½ | 135 | 753 | 131 | 746 | 148 | 743 | 129 | 1 593 |
| 60 | 3½ | 136 | 746 | 150 | 716 | 131 | 739 | | |

1 Already overheated.

Example 2

A mixture of 100 parts of smoked sheets, 5 parts of sulfur, 5 parts of zinc white and 1 part of tricrotonylidenetetramine (anhydrous, melting point 102° C.) is heated for 15 minutes under 3½ atmospheres pressure. The vulcanization product displays a strength of 180 kg/sq. cm. with an extension of 660%.

Example 3

A mixture of 100 parts of smoked sheets, 5 parts of sulfur, 5 parts of zinc white and 1 part of tricrotonylidenetetramine (melting point = 76° C.) is heated for 25 minutes under 3½ atmospheres pressure. The vulcanization product displays a strength of 183 kg/sq. cm. and an extension of 703%.

Example 4

A mixture of 100 parts of smoked sheets, 5 parts of sulfur, 5 parts of zinc oxide and 1 part of tricrotonylidenetetramine (anhydrous, boiling point under 3 mm. pressure = 138–140° C.) is heated for 15 minutes under 3½ atmospheres pressure. The vulcanization product displays a strength of 201 kg/sq. cm. and an extension of 685%.

Example 5

A mixture of 100 parts of smoked sheets, 5 parts of sulfur, 5 parts of zinc white and 1 part of accelerator (a mixture of the two hydrated isomers hereinbefore described) is heated for 25 minutes under 3½ atmospheres pressure. The vulcanization product displays a strength of 205 kg/sq. cm. and an extension of 744%.

Example 6

A mixture of 100 parts of smoked sheets, 5 parts of sulfur and 5 parts of zinc white is heated for 30 minutes under 1½ atmospheres pressure with one part of acetaldehyde ammonia or with tricrotonylidenetetramine, (melting point 97° C.) In the former case the vulcanization product displays the already quite considerable strength of 71 kg/sq. cm. at an extension of 851%, in the latter case, on the contrary, only a strength of 12 kg/sq. cm. at an extension of 869%. From these figures the favorable critical temperature of the tricrotonylidenetetramine accelerator becomes evident.

Example 7

A mixture of 100 parts of smoked sheets, 4 parts of sulfur, 5 parts of zinc white and 1 part of acrolein-ammonia is heated for 40 minutes under 3½ atmospheres pressure. The vulcanization product thus obtained displays a strength of 168 kg/sq. cm. at an extension of 873%.

Example 8

A mixture of 100 parts of smoked sheets, 5 parts of sulfur, 5 parts of zinc oxide and 1 part of the condensation product of alpha-ethyl-beta-propyl-acrolein and ammonia is heated for 15 minutes under 3½ atmospheres pressure. The vulcanization product thus obtained displays a strength of 224 kg/sq. cm. at an extension of 675%.

Example 9

A mixture of 100 parts of smoked sheets, 40 parts of sulfur and 1.25 parts of tricrotonylidenetetramine (a mixture of the two isomers) is heated for about 60 minutes at a pressure of four atmospheres. A hard rubber of great technical value is thus obtained.

In the following claims the term "tricrotonylidenetetramine" is intended to include the two isomers referred to above, which are obtained according to the cited process of Wurtz as well as the mixture of these two isomers. The term "rubber" is intended to include as well natural rubber varieties as artificial rubber like substances.

I claim:—

1. In the process of vulcanizing rubber, the step which comprises adding tricrotonylidenetetramine to the rubber.

2. The process which comprises incorporating with rubber, sulfur and tricrotonylidenetetramine and vulcanizing the mixture.

3. The vulcanization products obtained according to the process claimed in claim 2, said vulcanization products possessing excellent ageing properties.

In testimony whereof, I affix my signature.

THEODOR WEIGEL.